United States Patent
Shahar

(10) Patent No.: US 9,110,860 B2
(45) Date of Patent: Aug. 18, 2015

(54) TOPOLOGY-AWARE FABRIC-BASED OFFLOADING OF COLLECTIVE FUNCTIONS

(75) Inventor: Yiftah Shahar, Gedera (IL)

(73) Assignee: MELLANOX TECHNOLOGIES TLV LTD., Ra'Anana (IL)

( * ) Notice: Subject to any disclaimer, the term of this patent is extended or adjusted under 35 U.S.C. 154(b) by 927 days.

(21) Appl. No.: 12/616,152

(22) Filed: Nov. 11, 2009

(65) Prior Publication Data

US 2011/0113083 A1    May 12, 2011

(51) Int. Cl.
- G06F 15/16 (2006.01)
- G06F 15/173 (2006.01)
- H04L 12/54 (2013.01)
- H04L 12/931 (2013.01)

(52) U.S. Cl.
CPC ...... *G06F 15/17393* (2013.01); *H04L 12/5689* (2013.01); *H04L 49/356* (2013.01); *H04L 49/358* (2013.01)

(58) Field of Classification Search
CPC ....................................... H04L 29/00
See application file for complete search history.

(56) References Cited

U.S. PATENT DOCUMENTS

| | | | |
|---|---|---|---|
| 5,068,877 A * | 11/1991 | Near et al. ..................... | 375/356 |
| 5,325,500 A | 6/1994 | Bell et al. | |
| 6,041,049 A * | 3/2000 | Brady ............................ | 370/351 |
| 6,857,004 B1 * | 2/2005 | Howard et al. ............... | 709/201 |
| 7,555,549 B1 | 6/2009 | Campbell et al. | |
| 7,613,774 B1 * | 11/2009 | Caronni et al. ............... | 709/205 |
| 2002/0010844 A1 | 1/2002 | Noel et al. | |
| 2002/0150106 A1 | 10/2002 | Kagan et al. | |
| 2002/0152327 A1 | 10/2002 | Kagan et al. | |
| 2002/0152328 A1 | 10/2002 | Kagan et al. | |
| 2003/0018828 A1 | 1/2003 | Craddock et al. | |
| 2003/0065856 A1 | 4/2003 | Kagan et al. | |
| 2004/0062258 A1 | 4/2004 | Grow et al. | |
| 2004/0078493 A1 * | 4/2004 | Blumrich et al. ............. | 709/250 |
| 2004/0120331 A1 * | 6/2004 | Rhine et al. ................... | 370/408 |
| 2004/0123071 A1 | 6/2004 | Stefan et al. | |
| 2004/0252685 A1 | 12/2004 | Kagan et al. | |
| 2005/0097300 A1 | 5/2005 | Gildea et al. | |

(Continued)

OTHER PUBLICATIONS

Infiniband Trade Association, "InfiniBand™ Architecture Specification", release 1.2.1, Jan. 2008.

(Continued)

*Primary Examiner* — Brian P Whipple
*Assistant Examiner* — Keyvan Emdadi
(74) *Attorney, Agent, or Firm* — D. Kligler I.P. Services Ltd.

(57) ABSTRACT

A computing method includes accepting a notification of a computing task for execution by a group of compute nodes interconnected by a communication network, which has a given interconnection topology and includes network switching elements. A set of preferred paths, which connect the compute nodes in the group via at least a subset of the network switching elements to one or more root switching elements, are identified in the communication network based on the given interconnection topology and on a criterion derived from the computing task. The network switching elements in the subset are configured to forward node-level results of the computing task produced by the compute nodes in the group to the root switching elements over the preferred paths, so as to cause the root switching elements to calculate and output an end result of the computing task based on the node-level results.

21 Claims, 2 Drawing Sheets

(56) References Cited

U.S. PATENT DOCUMENTS

| | | | |
|---|---|---|---|
| 2005/0131865 A1 | 6/2005 | Jones et al. | |
| 2008/0168471 A1 | 7/2008 | Benner et al. | |
| 2008/0288949 A1 | 11/2008 | Bohra et al. | |
| 2009/0063816 A1 | 3/2009 | Arimilli et al. | |
| 2009/0182814 A1 | 7/2009 | Tapolcai et al. | |
| 2009/0247241 A1* | 10/2009 | Gollnick et al. | 455/574 |
| 2010/0049836 A1* | 2/2010 | Kramer | 709/220 |

OTHER PUBLICATIONS

U.S. Appl. No. 12/621,523 "Dynamically-connected transport service" filed Nov. 19, 2009.

U.S. Appl. No. 12/945,904 "Cross-Channel Network Operation Offloading for Collective Operations" filed Nov. 15, 2010.

Mellanox Technologies, "InfiniScale IV: 36-port 40GB/s Infiniband Switch Device", Sunnyvale, California, 2009.

Mellanox Technologies Inc., "Scaling 10Gb/s Clustering at Wire-Speed", Santa Clara, California, USA 2006.

IEEE 802.1D Standard "IEEE Standard for Local and Metropolitan Area Networks—Media Access Control (MAC) Bridges", IEEE Computer Society, USA, Jun. 9, 2004.

IEEE 802.1AX Standard "IEEE Standard for Local and Metropolitan Area Networks—Link Aggregation", IEEE Computer Society, USA, Nov. 3, 2008.

Turner et al., "Multirate Clos Networks", IEEE Communications Magazine, Oct. 2003.

Thayer School of Engineering, "An Slightly Edited Local Copy of Elements of Lectures 4 and 5", Dartmouth College, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 2.2, Sep. 4, 2009.

Coti et al., "MPI Applications on Grids: a Topology Aware Approach," Proceedings of the 15th International European Conference on Parallel and Distributed Computing (EuroPar'09), Delft, the Netherlands, Aug. 2009.

Petrini et al., "The Quadrics Network (QsNet): High-Performance Clustering Technology," Proceedings of the 9th IEEE Symposium on Hot Interconnects (HotI'01), Palo Alto, California, Aug. 2001.

Sancho et al., "Efficient Offloading of Collective Communications in Large-Scale Systems," Proceedings of the 2007 IEEE International Conference on Cluster Computing, Austin, Texas, Sep. 17-20, 2007.

U.S. Appl. No. 12/945,904 Official Action dated Dec. 5, 2012.

U.S. Appl. No. 12/945,904 Official Action dated Aug. 23, 2013.

* cited by examiner

TOPOLOGY-AWARE FABRIC-BASED OFFLOADING OF COLLECTIVE FUNCTIONS

FIELD OF THE INVENTION

The present invention relates generally to distributed computing, and particularly to methods and systems for performing collective computing operations in distributed computer networks.

BACKGROUND OF THE INVENTION

Large and complex computing tasks are sometimes carried out by distributed computer systems, which comprise multiple interconnected compute nodes. Parallelizing a computing task among multiple compute nodes helps to reduce task execution time, and enables execution of large computing tasks in reasonable run times.

Some known communication protocols and Application Programming Interfaces (APIs) have been designed particularly to facilitate task execution over multiple distributed compute nodes. An example protocol is the Message Passing Interface (MPI), which is specified by the MPI forum in "MPI: A Message-Passing Interface Standard," version 2.2, Sep. 4, 2009, which is incorporated herein by reference. In particular, chapter 5 of the MPI standard specifies collective communication functions involving a group or groups of software processes. Several techniques for performing collective functions are known in the art. Example methods are described in U.S. Patent Application Publication 2009/0063816, whose disclosure is incorporated herein by reference.

Coti et al. propose a programming method and a modification of the MPI runtime environment that take Wide Area Network (WAN) topology into consideration, in "MPI Applications on Grids: a Topology Aware Approach," Proceedings of the 15th International European Conference on Parallel and Distributed Computing (EuroPar'09), Delft, the Netherlands, August 2009, which is incorporated herein by reference.

Petrini et al. describe a network interconnection scheme called the Quadrics Network (QsNet), in "The Quadrics Network (QsNet): High-Performance Clustering Technology," Proceedings of the 9th IEEE Symposium on Hot Interconnects (HotI'01), Palo Alto, Calif., August 2001, which is incorporated herein by reference. QsNet integrates a programmable processor in the network interface, which allows the implementation of intelligent communication protocols.

Some known techniques attempt to offload the processing of collective functions from the compute nodes. For example, Sancho et al., describe a method that dedicates some compute node processors in the system to perform only collective functions, in "Efficient Offloading of Collective Communications in Large-Scale Systems," Proceedings of the 2007 IEEE International Conference on Cluster Computing, Austin, Tex., Sep. 17-20, 2007, which is incorporated herein by reference. As another example, U.S. Patent Application Publication 2005/0097300, whose disclosure is incorporated herein by reference, describes a dedicated hardware-based collective offload engine that provides collective processing of data from processing nodes in a distributed computing environment. The dedicated collective offload hardware engine is coupled to a switch fabric. A result is produced by the collective offload hardware engine based on the collective processing of the data, and is forwarded to at least one processing node. Collective processing is facilitated by communication among a plurality of dedicated collective offload engines via the switch fabric or via a private channel disposed between the collective offload engines.

SUMMARY OF THE INVENTION

An embodiment of the present invention provides a computing method, including:

accepting a notification of a computing task for execution by a group of compute nodes interconnected by a communication network, which has a given interconnection topology and includes network switching elements;

identifying, based on the given interconnection topology and on a criterion derived from the computing task, a set of preferred paths in the communication network that connect the compute nodes in the group via at least a subset of the network switching elements to one or more root switching elements; and configuring the network switching elements in the subset to forward node-level results of the computing task produced by the compute nodes in the group to the root switching elements over the preferred paths, so as to cause the root switching elements to calculate and output an end result of the computing task based on the node-level results.

In some embodiments, determining the preferred paths includes selecting one or more of the network switching elements to serve as the root switching elements. In an embodiment, determining the preferred paths includes selecting two or more root switching elements, and the method includes configuring a given compute node to receive two or more end results from the respective root switching elements and to reduce the two or more end results to a single end result. In another embodiment, configuring the network switching elements includes causing a given network switching element in the subset to reduce a respective portion of the node-level results forwarded thereto to a single interim result, and to forward the interim result to one of the root switching elements.

In a disclosed embodiment, configuring the network switching elements includes notifying a Central Processing Unit (CPU) in a given network switching element in the subset of an identity of another switching element to which the node-level results are to be forwarded, so as to cause the CPU to configure a switching fabric in the given network switching element to forward the node-level results to the other switching element. In another embodiment, the method includes configuring a given compute node in the group to reduce multiple results of the computing task produced in the given compute node, so as to produce a single node-level result, and to forward the single node-level result to one of the root switching elements.

Configuring the network switching elements may include configuring the root switching elements to forward the end result to a specified compute node. Alternatively, configuring the network switching elements may include configuring the root switching elements to forward the end result to all the compute nodes in the group. In some embodiments, the method includes detecting a change in the interconnection topology, and modifying the set of the preferred paths responsively to the detected change. In an embodiment, the computing task includes a Message Passing Interface (MPI) function.

There is additionally provided, in accordance with an embodiment of the present invention, a computing method, including:

for a computing task that is assigned for execution by a group of compute nodes, receiving multiple node-level results of the computing task from the compute nodes by two or more network switching elements that are different from the compute nodes assigned to execute the computing task;

reducing a respective portion of the node-level results received in each network switching element to produce a respective single interim result, and forwarding the interim results to one or more root switching elements; and computing and outputting an end result of the computing task by the root switching elements.

In some embodiments, the computing task specifies an operation to be performed by each of the compute nodes in the group on respective local data, and reducing the node-level results includes performing the specified operation on the respective portion of the node-level results by each of the switching elements, so as to produce the interim results.

There is also provided, in accordance with an embodiment of the present invention, a computing apparatus, including:

an interface coupled to communicate with a communication network, which includes network switching elements that interconnect compute nodes according to a given interconnection topology; and a processor, which is configured to accept a notification of a computing task for execution by a group of the compute nodes, to identify, based on the given interconnection topology and on a criterion derived from the computing task, a set of preferred paths in the communication network that connect the compute nodes in the group via at least a subset of the network switching elements to one or more root switching elements, and to configure the network switching elements in the subset to forward node-level results of the computing task produced by the compute nodes in the group to the root switching elements over the preferred paths, so as to cause the root switching elements to calculate and output an end result of the computing task based on the node-level results.

There is further provided, in accordance with an embodiment of the present invention, a computing system including two or more network switching elements, which are configured to receive multiple node-level results of a computing task that is assigned for execution by a group of compute nodes different from the switches, to reduce a respective portion of the node-level results received in each network switching element to produce a respective single interim result, and to forward the interim results to one or more root switching elements so as to cause the root switching elements to compute and output an end result of the computing task.

The present invention will be more fully understood from the following detailed description of the embodiments thereof, taken together with the drawings in which:

DETAILED DESCRIPTION OF EMBODIMENTS

Overview

Figure 1:
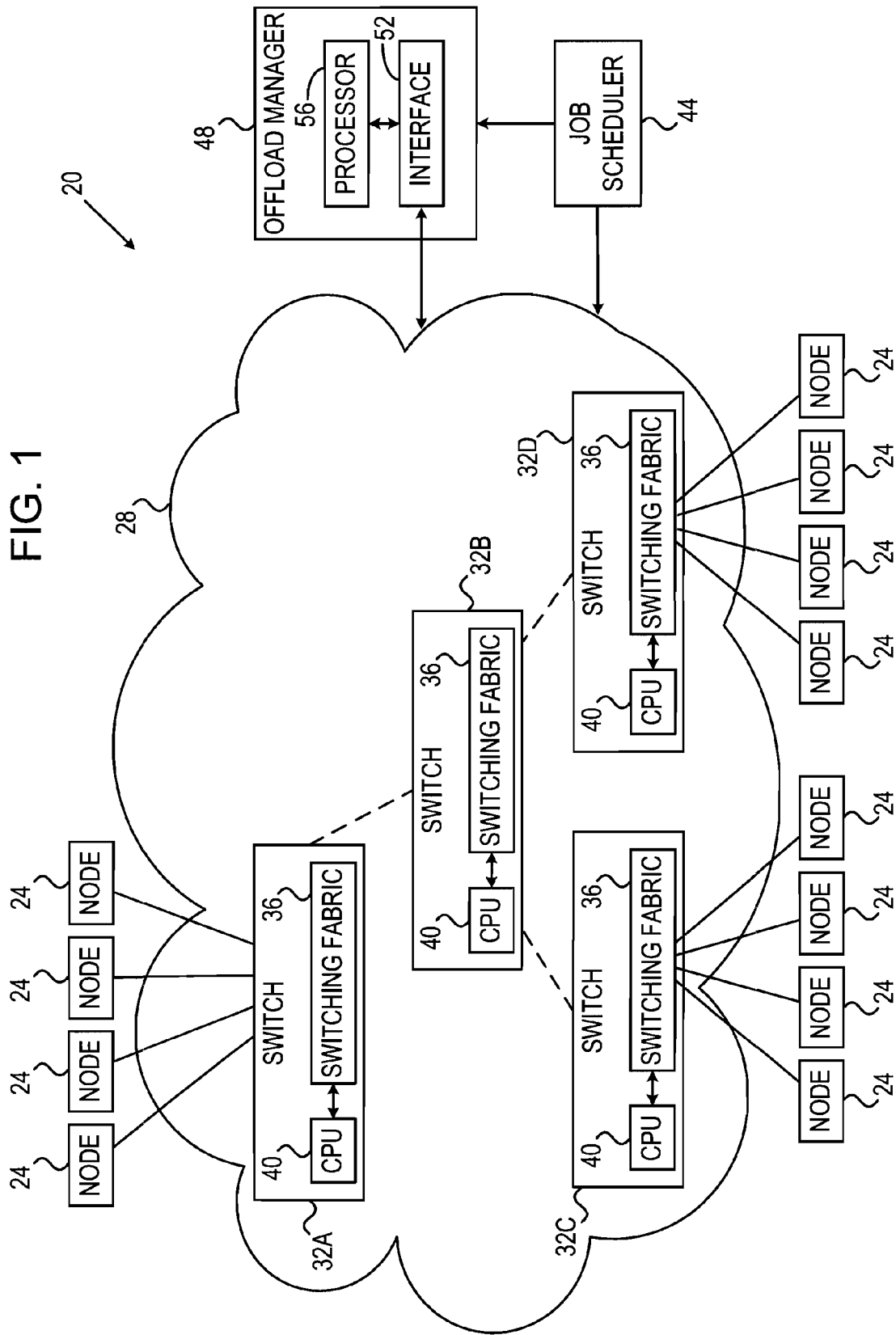
FIG. 1 is a block diagram that schematically illustrates a distributed computing system, in accordance with an embodiment of the present invention.

Collective functions comprise various computation and communication functions that are carried out collectively by multiple software processes, typically running on multiple compute nodes. Reduction functions are a specific type of collective functions, which collect data from multiple processes and process the data to produce an end result ("reduce the data to an end result"). For example, the MPI specification defines an MPI_REDUCE function, which collects data from a group of processes, performs a certain operation (e.g., sum, maximum or minimum) on the data, and sends the end result to one of the processes. An MPI_ALLREDUCE function is similar to MPI_REDUCE, but sends the end result to all the processes in the group. In many distributed computing applications, and particularly in large scale applications having large numbers of processes and nodes, collective functions account for a significant portion of the overall application run time.

Embodiments of the present invention that are described hereinbelow provide improved methods and systems for performing collective functions (e.g., MPI_REDUCE and MPI_ALLREDUCE) in a distributed computing system. Such systems comprise multiple compute nodes that are interconnected by a communication network. The network comprises one or more switching elements (e.g., network switches) and has a certain interconnection topology. The methods and systems described herein use the switching elements to offload most of the processing and communication associated with collective functions from the compute nodes.

In some embodiments, offloading is controlled by a server, which is referred to as an offload manager. The offload manager is notified of a computing task that is assigned for execution by a designated group of compute nodes. The offload manager selects, based on the interconnection topology of the communication network, a preferred set of paths in the network for collecting interim results of the computing task from the compute nodes. The selected set of paths (referred to as a collection tree) connects the compute nodes in the group to a given switching element (referred to as the root of the collection tree). The offload manager may apply various criteria for optimal selection of the collection tree based on the interconnection topology of the network. In particular, the offload manager selects the switching element that will serve as the root.

The offload manager configures the switching elements and the compute nodes to forward the interim results from the nodes toward the root switching element. Typically, each switching element is also configured to reduce the interim results it receives from the compute nodes to a single interim result, and to forward the single result toward the root node. Using this configuration, the switching elements progressively reduce the interim results as they flow toward the root, thus reducing the traffic volume.

Once the switching elements are configured, the system executes the computing task in question. Each compute node in the group produces a node-level result based on its local data, and forwards the node-level result to one of the switching elements. Each switching element reduces the node-level results it receives to a single interim result, and forwards this result up the collection tree toward the root, as configured by the offload manager. The root switching element reduces the interim results it receives to produce an end result of the computing task. In some embodiments (e.g., in an MPI_REDUCE function) the end result is forwarded to a specific process in the group. In alternative embodiments (e.g., in an MPI_ALLREDUCE function) the end result is forwarded to all the processes in the group.

Since the methods and systems described herein are implemented mainly in the switching elements, they offload most of the processing and networking associated with collective functions from the compute nodes. This sort of offloading reduces the execution time of collective functions, and also improves the performance of the computing system's application layer. Since most of the collective function processing is offloaded to the switching elements, the disclosed techniques enable collective functions to be implemented in a non-blocking manner (i.e., in a manner that minimizes application blockage during execution of collective functions). As a result, application performance is further improved. Since each switching element reduces the interim results it receives before forwarding, the likelihood of congestion is reduced. Since offloading is based on the actual interconnection topology of the network, the run time of collective functions can be reduced considerably while using network resources efficiently.

System Description

FIG. 1 is a block diagram that schematically illustrates a distributed computing system 20, in accordance with an embodiment of the present invention. System 20 comprises multiple compute nodes 24, which are interconnected by a communication network 28. Nodes 24 may comprise, for example, servers, workstations, personal computers or any other suitable type of computers. In the present example, network 28 comprises an Infiniband network. Alternatively, network 28 may comprise any other suitable network type. Network 28 is sometimes referred to as a High Performance Computer LAN fabric network.

Network 28 comprises one or more network switching elements 32, which forward traffic to and from nodes 24. In the present example, network 28 comprises four switches denoted 32A . . . 32D. Each switch comprises switching fabric 36 and a Central Processing Unit (CPU) 40. The CPUs are closely integrated with the switching elements. Each switch comprises multiple ports for connecting to nodes 24 and/or to other switches. Switching fabric 36 may be implemented, for example, in one or more Application-Specific Integrated Circuits (ASIC) or Field-Programmable Gate Arrays (FPGA).

System 20 comprises a job scheduler 44, which schedules computing jobs for execution by the compute nodes. The embodiments described herein refer mainly to computing tasks that are specified using MPI ("MPI jobs"). Alternatively, however, computing tasks can be specified using any other suitable protocol or language. In particular, some of the computing tasks scheduled by scheduler 44 comprise collective functions such as MPI_REDUCE and MPI_ALLREDUCE. Typically, scheduler 44 designates a certain group of compute nodes 24 to execute each given computing task.

System 20 comprises an offload manager 48, typically a server that is connected to network 28. For each computing task scheduled by job scheduler 44, offload manager 48 configures at least some of switches 32, as well as some of nodes 24, to perform the computing task efficiently. In particular, when the computing task comprises a collective function such as MPI_REDUCE and MPI_ALLREDUCE, the offload manager configures switches 32 to carry out some of the processing associated with the collective function execution, thereby offloading the compute nodes. These offloading techniques are explained in greater detail below. Offload manager 48 comprises an interface 52 for connecting to network 28, and a processor 56 that carries out the configuration methods described herein.

The system configuration shown in FIG. 1 is an example configuration, which is chosen purely for the sake of conceptual clarity. In alternative embodiments, any other suitable configuration can also be used. For example, in some embodiments the offload manager and the job scheduler can be integrated in a single computer platform, e.g., in a single server.

In one embodiment, each switch 32 comprises an Infiniband switch, which is fabricated either in a single ASIC, or on a line card that plugs into a backplane so as to create a switching fabric in a single chassis. In this example embodiment, the switch has eighteen ports for connecting to compute nodes, e.g., using Quad Small Form-factor Pluggable (QSFP) connectors. The switch may comprise eighteen ports for connecting to other switches in the network. The switch provides non-blocking, any-port-to-any-port switching capability. Any other suitable switch configuration can also be used. In an example embodiment, fabric 36 comprises an InfiniScale® IV device, produced by Mellanox® Technologies (Sunnyvale, Calif.). Alternatively, any other suitable devices and protocols (e.g., Gigabit Ethernet switching) can also be used. CPU 40 is tightly integrated to the switching element, and may communicate with switching fabric 36 using a Peripheral Component Interconnect (PCI), a Peripheral Component Interconnect Express (PCI-Exp) connection, or using any other suitable protocol.

Typically, CPUs 40 and processor 56 comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory. CPUs 40 may comprise, for example, microprocessors supporting the x86 architecture, 64-bit x86-64 microprocessors, Itanium processors (also referred to as IA64), PowerPC (PPC) 32-bit or 64-bit microprocessors, or any other suitable processor type. CPUs 40 may run any suitable operating system, such a Linux. The software running on CPUs 40 may be written in any suitable language, such as C or C++.

Fabric-Based Offloading

The embodiments described herein refer mainly to collective functions that are specified as part of MPI jobs. A given MPI job typically specifies a group of processes, which run on one or more compute nodes. MPI defines "communicators," which comprise logical groups of processes that interact with one another. A given MPI job typically specifies a default communicator, which comprises the entire group of processes assigned to that job. Within a given job, MPI may define one or more sub-communicators, which comprise partial subsets of the processes, for carrying out specific tasks. Once a certain communicator is defined, it can be used to perform collective functions. The description that follows refers to collective functions, which are performed using MPI communicators specified in MPI jobs. The disclosed methods and systems, however, are not limited to MPI applications, and can be used to perform any other type of collective functions specified in any other suitable manner.

Consider a given MPI application job, which is scheduled by scheduler 44 for execution by specific MPI processes running on a group of two or more compute nodes in system 20. The MPI job specifies one or more collective functions to be performed by the processes running on the nodes in the group. Some collective functions specify an operation (e.g., summation, maximum, minimum, product, or logical or bit-wise AND, OR or XOR) to be performed on data that is accessible to the nodes in the group. Other collective functions (e.g., MPI_ALLTOALL, MPI_GATHER and MPI_S-

CATTER) do not perform arithmetic operations, but rather synchronize the processes or exchange data among the processes.

In some embodiments, offload manager 48 configures one or more of the switches of network 28, and the compute nodes in the group, to perform the collective functions efficiently.

Figure 2:
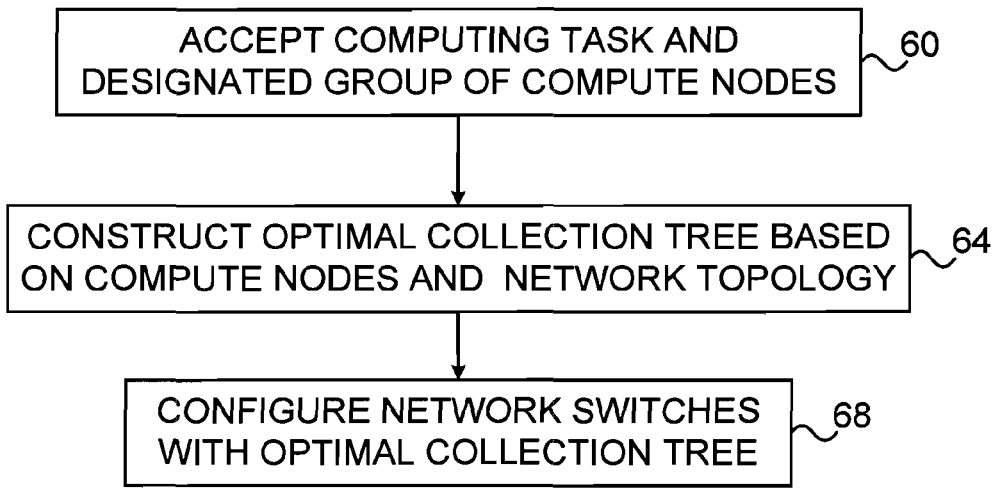
FIG. 2 is a flow chart that schematically illustrates a method for configuring a distributed computing system to perform topology-aware offloading of a collective function, in accordance with an embodiment of the present invention.
Figure 3:
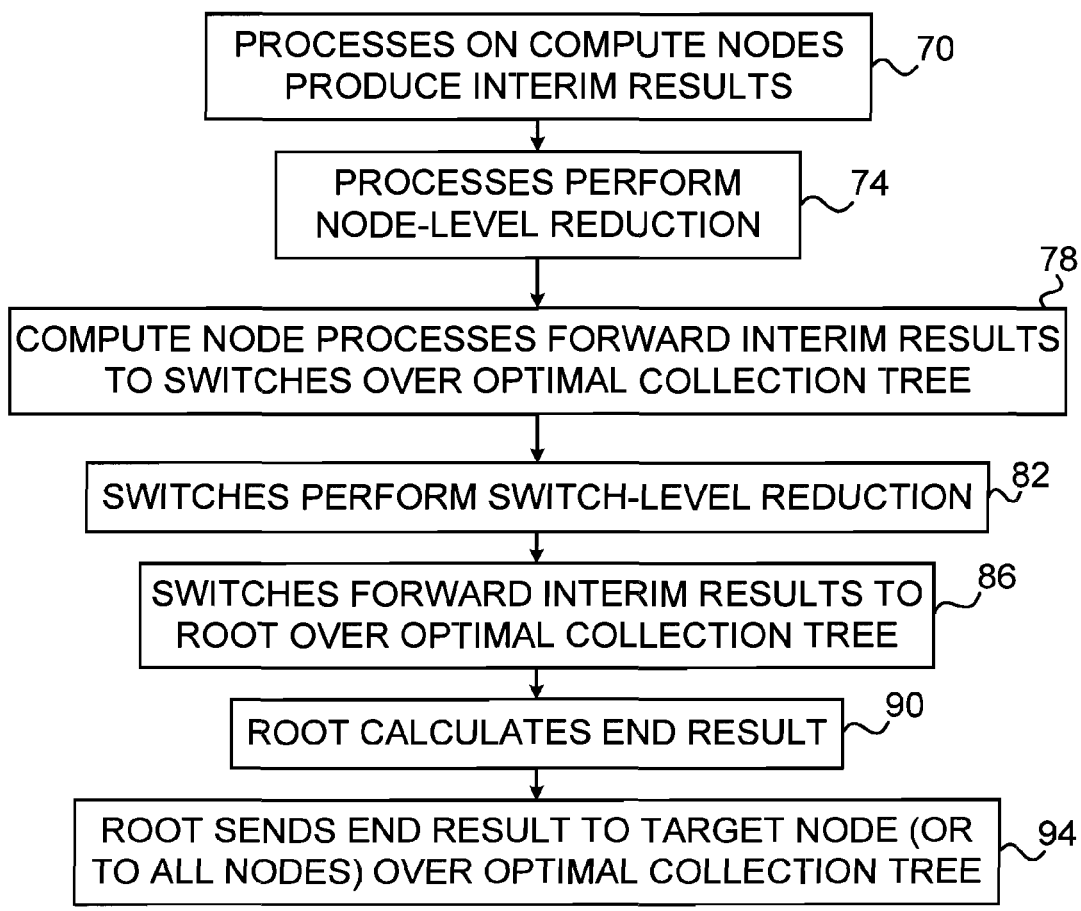
FIG. 3 is a flow chart that schematically illustrates a method for executing a collective function in a system configured using the method of FIG. 2, in accordance with an embodiment of the present invention.

FIG. 2 below describes a method for configuring the compute nodes and switches by the offload manager. FIG. 3 further below describes a method for executing a collective function by the compute nodes and switches, after they have been pre-configured by the offload manager. Typically, the offload manager is concerned with entire MPI jobs, or individual communicators, and not with individual collective functions. Once the compute nodes and switches are configured by the offload manager, they perform collective functions without involving the offload manager.

Note that the functionality of network switches 32 is different and distinct from that of compute nodes 24. Nodes 24 are assigned by job scheduler 44 to run MPI processes that perform collective functions, and hold (or have access to) local data on which they perform the operations specified in the collective functions. Switches 32, on the other hand, forward network traffic in network 28. Switches 32 are not designated by the job scheduler to perform collective functions. (In MPI applications, for example, the switches are not specified in the MPI functions.) The switches offload some of the processing associated with the collective function (e.g., reduction of node-level results) from the compute nodes, and also reduce communication volume. The switches do not operate on local data, but rather on node-level or interim results that are forwarded from the compute nodes or from other switches.

FIG. 2 is a flow chart that schematically illustrates a method for configuring system 20 to perform offloading of a collective function, in accordance with an embodiment of the present invention. The method begins with offload manager 48 receiving from job scheduler 44 a notification of a computing task (e.g., an MPI job), at a task input step 60. The computing task involves a collective function, which is to be carried out by multiple software processes running on a designated group of compute nodes 24. Generally, each compute node in the group may run one or more of the processes. The notification from job scheduler 44 specifies a communicator, as explained above, which identifies the processes and compute nodes that are designated to execute this MPI job.

In response to the notification, offload manager 48 selects a preferred set of paths through network 28 for collecting interim results of the communicator from the compute nodes in the group, at a tree selection step 64. The paths connect the compute nodes in the group to one of the switches, which is assigned to produce the end result of the collective function. Each path in the set traverses one or more of the network switches. The set of paths is referred to as a collection tree, and the switch that is selected to produce the end result is referred to as the root of the tree. In some embodiments, the end result is produced by multiple switches—these embodiments are described in detail further below.

Offload manager 48 selects the optimal collection tree based on the interconnection topology of network 28, and in particular the connectivity among the compute nodes in the group designated to perform the collective function in question. The offload manager may use various policies and criteria for selecting the optimal collection tree based on the network topology, and/or the packet handling and/or computing power capabilities of different system components. Typically, the selection criteria are derived from the collective function to be performed.

For example, the offload manager may identify the tree that spans the compute nodes in the group with the minimal number of network hops, given the physical connectivity of the nodes and switches. As another example, the offload manager may select the collection tree based on the communication capabilities (e.g., bandwidth or latency) of the network links. The offload manager may consider the current utilization of specific network links by different communicators, so as to balance the load over available links and reduce link buffering utilization. The offload manager may identify situations in which certain CPUs 40 lack messaging or reduction capabilities, and select the collection tree in a way that does not utilize these CPUs.

In some embodiments, the offload manager may select the optimal tree based on characteristics of the switches and compute nodes. Such characteristics may comprise, for example, the load on CPUs 40 by the communicator, and/or the computation or communication performance of the switches and compute nodes. The offload manager may consider the capabilities of CPUs 40 to perform data reduction and receive messages. For example, in some scenarios the offload manager may conclude that it is preferable to perform a certain reduction operation in the compute nodes rather than in the CPUs of the switches. As yet another example, the offload manager may select the optimal tree in a way that aggregates messages, minimizes communication traffic and reduces fabric congestion. Additionally or alternatively, the offload manager may apply any other suitable criteria for selecting the optimal collection tree.

Offload manager 48 configures one or more of the network switches, and the compute nodes in the group, to forward interim results of the collective function according to the selected collection tree, at a configuration step 68. Typically, the offload manager configures each compute node (and in particular each process) in the group with the identity of a given switch to which the interim result of the collective function is to be forwarded.

For a given switch that lies on a path belonging to the collection tree, the offload manager configures the switch to forward interim results of the collective function (received from compute nodes in the group either directly or via one or more other switches) to a given switch that is "higher" along the collection tree. In other words, each switch is notified of its parent switch in the tree, and of its lower-level tree elements (compute nodes or switches).

The offload manager configures the selected root switch to reduce the interim result it receives to a single end result. If the collective function specifies that the end result is sent to a single target process (e.g., in an MPI_REDUCE function), the offload manager configures the root switch to forward the end result to the node running that process. If the collective function specifies that the end result is sent to all the nodes (e.g., in an MPI_ALLREDUCE function), the offload manager configures the root switch to forward the end result to all the nodes in the group (e.g., using multicast).

Typically, the configuration in each switch 32 is managed by CPU 40, which in turn controls fabric 36 accordingly. Offload manager 48 configures a given switch by communicating with CPU 40 of that switch. The CPU then stores the relevant configuration information (e.g., communicator identities of parents and lower-level elements in the tree) and configures fabric 36 using this information. A given switching fabric 36 is configured to pass traffic to the respective CPU 40 when this CPU is configured in the collective messaging as the address.

FIG. 3 is a flow chart that schematically illustrates a method for executing a collective function in system 20, in accordance with an embodiment of the present invention. The method of FIG. 3 assumes that the group of compute processes designated to carry out the collective function, as well as the relevant CPUs 40, have been pre-configured using the method of FIG. 2 above.

The method begins with the software processes, which run on the compute nodes in the group, producing interim results of the collective function, at a process execution step 70. Each compute node in the group reduces the interim results produced by its local processes to a single node-level result, at a node-level reduction step 74. The actual reduction operation depends on the type of collective function. For example, for a summation operation, the node-level result comprises a sum of the interim results produced by the processes of the node. For a collective function that finds the maximum value of the data, the node-level result comprises the maximal value of the interim results produced by the processes of the node. For a compute node that runs only a single process, the node-level result is equal to the interim result produced by the single process. For collective operations that do not involve reduction operations but rather data exchange between processes (e.g., MPI_ALLTOALL, MPI_GATHER and MPI_SCATTER), the switches along the collection tree reduce the number of exchanged messages, synchronize message flow and thus reduce fabric congestion.

The compute nodes forward their respective node-level results along the optimal collection tree, at a node-level forwarding step 78. Each compute node 24 in the group forwards its node-level result to the appropriate network switch, as configured by the offload manager at step 68 of the method of FIG. 2 above.

The network switches belonging to the collection tree reduce the interim results they receive, at a switch-level reduction step 82. In each switch 32, CPU 40 reduces the interim results received at the switch (directly from nodes 24 or from other switches) to a single interim result, also referred to as a switch-level result. The actual reduction operation depends on the type of collective function, as explained above with regards to the node-level reduction operation.

The switches belonging to the collection tree forward their respective switch-level results toward the root switch, at a switch-level forwarding step 86. Each switch forwards its switch-level result to a given switch (which may be the root switch itself or another switch en-route to the root switch along the collection tree), as configured by the offload manager at step 68 of the method of FIG. 2 above.

CPU 40 of the root switch receives the interim results and reduces them to an end result of the collective function, at an end result calculation step 90. For example, when the collective function comprises a summation operation, the CPU of the root switch sums the interim results. When the collective function comprises a minimum operation, the CPU of the root switch finds the minimal value among the interim results. The root switch may receive the interim results from the switches along the collection tree and/or from compute nodes in the group that are connected locally to its ports.

The root switch outputs the end result, at an output step 94. For example, if the collective function comprises an MPI_REDUCE function, the root switch sends the end result to the designated target node. If the collective function comprises an MPI_ALLREDUCE function, the root switch sends the end result to all the nodes in the group. Sending the end result to multiple nodes can be performed, for example, by sending a multicast message.

As can be seen in FIG. 3, the interim results of the collective function are progressively reduced by the compute nodes and switches as they flow up the collection tree to the root. This technique optimizes the use of network resources and reduces the likelihood of network congestion.

In some embodiments, when selecting the collection tree for a given communicator, offload manager 48 defines two or more root switches instead of a single root switch. In these embodiments, each of the root switches calculates a respective end result of the collective function, and forwards the end result to the appropriate target process or processes (e.g., using multicast). Each target process receives multiple end results—one end result from each root switch, and performs a final reduction to produce a single end result of the collective function.

Typically, offload manager 48 holds a topology map, which defines the interconnection topology of network 28. The offload manager uses this topology map in determining optimal collection trees for collective functions. In some embodiments, the offload manager accepts a definition of the interconnection topology of the network, e.g., from an operator. In alternative embodiments, the offload manager discovers and learns the interconnection topology of network 28 automatically, during system operation. In particular, the offload manager may identify topology changes that occur in the network, for example as a result of equipment failures, network reconfiguration or upgrades. Upon detecting a topology change, the offload manager updates its topology map, so that collection tree selection will be based on the up-to-date network topology.

The description above addresses a single collective communicator assigned to a specific group of compute nodes. Typically, however, system 20 handles multiple collective communicators concurrently, each communicator assigned to a respective group of compute nodes. Groups of compute nodes that are assigned to execute different collective functions may overlap. In other words, a given compute node may belong to two or more groups that are assigned to execute multiple different communicators and collective functions. Offload manager 48 typically handles multiple collective communicators concurrently—e.g., identifies optimal collection trees and configures switches and compute nodes for multiple collective functions. Typically, offload manager 48 is aware of all the communicators that are being configured to operate at a given time, and thus optimizes the utilization of the network and switch CPUs in an optimal and balanced way.

Although the embodiments described herein mainly address efficient offloading of collective reduction functions and to offloading of data exchange messaging, the methods and systems described herein can also be used in other applications, such as in messaging for financial algorithm trading that involve group messaging or in other reduction and group communication systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:
1. A computing method, comprising:
providing a computing system that includes a plurality of compute nodes interconnected by a communication network, formed of network switching elements;
wherein the switching elements are separate from the compute nodes;

accepting, by a processor serving as an offload manager, a notification of a computing task for execution by the computing system, the notification specifying a designated partial group of the compute nodes assigned by a job scheduler, separate from the offload manager, to execute the computing task;

identifying, by the processor, based on the given interconnection topology and on a criterion derived from the computing task, a subset of the network switching elements to be configured to connect the compute nodes in the designated partial group to one or more root switching elements; and configuring the network switching elements in the subset, by the processor, to forward node-level results of the computing task produced by the compute nodes in the designated partial group to the one or more root switching elements through the subset, so as to cause the one or more root switching elements to calculate and output an end result of the computing task based on the node-level results.

2. The method according to claim 1, wherein identifying the subset comprises selecting one or more of the network switching elements to serve as the one or more root switching elements.

3. The method according to claim 1, wherein identifying the subset comprises selecting two or more root switching elements, and comprising configuring a given compute node to receive two or more end results from the respective root switching elements and to reduce the two or more end results to a single end result.

4. The method according to claim 1, wherein configuring the network switching elements comprises causing a given network switching element in the subset to reduce a respective portion of the node-level results forwarded thereto to a single interim result, and to forward the interim result to one of the root switching elements.

5. The method according to claim 1, wherein configuring the network switching elements comprises notifying a Central Processing Unit (CPU) in a given network switching element in the subset of an identity of another switching element to which the node-level results are to be forwarded, so as to cause the CPU to configure a switching fabric in the given network switching element to forward the node-level results to the other switching element.

6. The method according to claim 1, and comprising configuring a given compute node in the group to reduce multiple results of the computing task produced in the given compute node, so as to produce a single node-level result, and to forward the single node-level result to one of the root switching elements.

7. The method according to claim 1, wherein configuring the network switching elements comprises configuring the root switching elements to forward the end result to a specified compute node.

8. The method according to claim 1, wherein configuring the network switching elements comprises configuring the root switching elements to forward the end result to all the compute nodes in the group.

9. The method according to claim 1, and comprising detecting, by the processor, a change in the interconnection topology, and modifying the set of the preferred paths responsively to the detected change.

10. The method according to claim 1, wherein the computing task comprises a Message Passing Interface (MPI) function.

11. A computing apparatus, comprising:
an interface coupled to communicate with a communication network, which includes network switching elements that interconnect a plurality of compute nodes according to a given interconnection topology;
wherein the switching elements are separate from the compute nodes; and
a processor, serving as an offload manager, which is configured to accept a notification of a computing task for execution, the notification specifying a designated partial group of the compute nodes assigned by a job scheduler, separate from the offload manager, to execute the computing task, to identify, based on the given interconnection topology and on a criterion derived from the computing task, a subset of the network switching elements to be configured to connect the compute nodes in the designated partial group to one or more root switching elements, and to configure the network switching elements in the subset to forward node-level results of the computing task produced by the compute nodes in the designated partial group to the one or more root switching elements through the subset, so as to cause the one or more root switching elements to calculate and output an end result of the computing task based on the node-level results.

12. The apparatus according to claim 11, wherein the processor is configured to select one or more of the network switching elements to serve as the root switching elements.

13. The apparatus according to claim 11, wherein the processor is configured to select two or more root switching elements, and to configure a given compute node to receive two or more end results from the respective root switching elements and to reduce the two or more end results to a single end result.

14. The apparatus according to claim 11, wherein the processor is configured to cause a given network switching element in the subset to reduce a respective portion of the node-level results forwarded to the given network switching element to a single interim result and forward the interim result to the root switching elements.

15. The apparatus according to claim 11, wherein the processor is configured to notify a Central Processing Unit (CPU) in a given network switching element in the subset of an identity of another switching element to which the node-level results are to be forwarded, so as to cause the CPU to configure a switching fabric in the given network switching element to forward the node-level results to the other switching element.

16. The apparatus according to claim 11, wherein the processor is configured to configure a given compute node in the group to reduce multiple results of the computing task produced in the given compute node, so as to produce a single node-level result, and forward the single node-level result to the root switching elements.

17. The apparatus according to claim 11, wherein the processor is configured to detect a change in the interconnection topology, and to modify the set of the preferred paths responsively to the detected change.

18. The method according to claim 1, wherein the computing task comprises a reduction function.

19. The method according to claim 1, wherein identifying a subset of the network switching elements comprises identifying one or more trees which connect the subset of compute nodes to the root switching elements.

20. A computing method, comprising:
providing a computing system that includes a plurality of compute nodes interconnected by a communication network, which has a given interconnection topology and includes network switching elements;

wherein the switching elements are separate from the compute nodes;

accepting, by a processor serving as an offload manager, from the network switching elements, information on the interconnection topology of the computing system;

accepting, by the processor, a notification of a reduction function for execution by a designated partial group of the compute nodes assigned by a job scheduler, separate from the offload manager, to execute the computing task;

identifying, by the processor, based on the given interconnection topology and on a criterion derived from the computing task, a subset of the network switching elements to be configured to connect the compute nodes in the designated partial group to one or more root switching elements; and configuring the network switching elements in the subset, by the processor, to forward node-level results of the computing task produced by the compute nodes in the designated partial group to the one or more root switching elements through the subset, so as to cause the root switching elements to calculate and output an end result of the computing task based on the node-level results.

21. The method according to claim 20, wherein the compute nodes execute the compute task after the switching elements are configured.

* * * * *